US011692845B2

(12) United States Patent
Kantarjiev et al.

(10) Patent No.: US 11,692,845 B2
(45) Date of Patent: Jul. 4, 2023

(54) PREDICTIVE ANNOTATION OF RELEVANT ROAD INFORMATION BASED ON VEHICLE LOCATION AND IDENTITY

(71) Applicant: Speedgauge, Inc., San Francisco, CA (US)

(72) Inventors: Christopher A. Kantarjiev, Palo Alto, CA (US); Matthew James Moehr, Minneapolis, MN (US); Daniel Benjamin Lyke, Petaluma, CA (US)

(73) Assignee: Speedgauge, Inc., San Francisco, CA (US)

( * ) Notice: Subject to any disclaimer, the term of this patent is extended or adjusted under 35 U.S.C. 154(b) by 83 days.

(21) Appl. No.: 16/885,019

(22) Filed: May 27, 2020

(65) Prior Publication Data

US 2020/0378781 A1 Dec. 3, 2020

Related U.S. Application Data

(60) Provisional application No. 62/854,762, filed on May 30, 2019.

(51) Int. Cl.
*G01C 21/36* (2006.01)
*G01C 21/34* (2006.01)
*G01C 21/32* (2006.01)

(52) U.S. Cl.
CPC ........... *G01C 21/367* (2013.01); *G01C 21/32* (2013.01); *G01C 21/3461* (2013.01); *G01C 21/3492* (2013.01); *G01C 21/3694* (2013.01)

(58) Field of Classification Search
CPC .. G01C 21/367; G01C 21/32; G01C 21/3461; G01C 21/3492; G01C 21/3694
See application file for complete search history.

(56) References Cited

U.S. PATENT DOCUMENTS

| | | | | |
|---|---|---|---|---|
| 2007/0244632 | A1* | 10/2007 | Mueller | G01C 21/3446 701/533 |
| 2008/0147305 | A1* | 6/2008 | Kawamata | B60W 50/0097 701/117 |
| 2015/0356118 | A1* | 12/2015 | Kalai | G06T 17/05 345/520 |
| 2018/0038695 | A1* | 2/2018 | Bitra | G08G 5/0069 |
| 2019/0066500 | A1* | 2/2019 | Roth | G01C 21/3484 |
| 2020/0209005 | A1* | 7/2020 | Hou | G01C 21/28 |

FOREIGN PATENT DOCUMENTS

EP 1111338 B1 * 2/2009 ............. G01C 21/32

* cited by examiner

*Primary Examiner* — Rachid Bendidi
*Assistant Examiner* — Sahar Motazedi
(74) *Attorney, Agent, or Firm* — Polsinelli LLP

(57) ABSTRACT

The present disclosure is directed to dynamically analyzing data and conditions associated with the movement of a vehicle. A processor may evaluate vehicle location and speed information when identifying an amount of navigation data to send to a computer at a vehicle. The amount of information sent to the computer may vary based on the vehicle speed, a type of road that the vehicle is able to drive along, or may vary based on other attributes. The information sent to the computer may also relate to an area that the vehicle is anticipated to move through in a given time frame. Mapping data sent to the vehicle computer may be associated with a larger area when a vehicle is moving at a faster speed and may be associated with a smaller area when the vehicle is moving at a slower speed.

21 Claims, 4 Drawing Sheets

PREDICTIVE ANNOTATION OF RELEVANT ROAD INFORMATION BASED ON VEHICLE LOCATION AND IDENTITY

CROSS-REFERENCE TO RELATED APPLICATIONS

The Present Application claims the priority benefit of U.S. provisional application 62/854,762 filed May 30, 2019 and entitled "Predictive Annotation of Relevant Road Information Based on Vehicle Location and Identity," the disclosure of which is incorporated herein by reference.

BACKGROUND OF THE INVENTION

Field of the Invention

The present invention is generally directed to tracking the geographic location of vehicles and to efficiently providing information to drivers. More specifically, the present invention is directed to optimizing communications with a vehicle navigation system.

Description of the Related Art

A Global Navigation Satellite System (GNSS) is a satellite-based geo-spatial positioning system in which a GNSS receiver device receives signals broadcast by multiple GNSS satellites orbiting the Earth. The signals received from these satellites allow a GNSS receiver to identify a location where the GNSS receiver is currently located. Examples of GNSS systems include the US-based Global Positioning System (GPS), the Russia-based Global Navigation Satellite System (GLONASS), the China-based BeiDou Navigation Satellite System (BDS), and the Europe-based Galileo GNSS.

Some vehicles include navigation devices with integrated GNSS receivers that may be used to determine a current location of a vehicle using received GNSS signals. GNSS signals combined with other signals may be used to identify a vehicle location with greater accuracy using techniques that are commonly referred to as assisted GPS. Signals may be received from satellites and from cell phone towers when a position of a vehicle is identified. These signals may be used by a navigation system that instructs a driver on how best to drive to a desired destination from a current location. Some vehicle navigation devices also store maps that may be combined with GNSS receiver-based positioning when routes are plotted along known road roadways in a map. These navigation devices may be built into the vehicle itself, as in a dashboard computer or may simply be located within the vehicle. Navigation devices may be mobile devices, such as driver's smartphone that may be temporarily placed in a vehicle. Vehicle navigation systems may receive data from a server to allow maps to be generated and displayed on a display. Conventionally, however, an amount of data sent to the vehicle navigation system from the server that is used to generate maps is not optimized for conditions or attributes associated with a thoroughfare along which a vehicle is moving. Conventionally, servers that provide data to navigation systems do not change an amount of data sent to specific navigation systems per unit time. This means that a server may send more data than is required for the navigation system to generate and display maps associated with vehicle motion. Because of this, servers that provide navigation data to navigation systems at many vehicles, may not be able to timely send required navigation data to each and every navigation system as desired. Simply put, as a number of navigation systems increase, servers that provide navigation data may be bandwidth constrained and this may lead to a particular navigation device not receiving data when required. What are needed are new methods and apparatus that change amounts of data sent to a vehicle navigation system based on conditions or attributes associated with a thoroughfare along which a vehicle is moving.

SUMMARY OF THE PRESENTLY CLAIMED INVENTION

In an embodiment of the presently claimed invention, a method includes receiving a location from a computer at a vehicle. The method includes identifying, based on the location, an area that includes the location. The method includes identifying one or more road segments that fall at least partially within the area. The method includes receiving road segment attribute information about the one or more road segments. The method includes sending information associated with one or more identified road segments and the road segment attribute information to the computing device at the vehicle.

A second claimed embodiment includes an apparatus for dynamic navigation. The apparatus includes a communication transceiver, a memory storing instructions, and a processor that executes the instructions to perform operations. The operations include receiving, at the communication transceiver from a computing device at a vehicle, a location. The operations include identifying, based on the location, an area that includes the location. The operations include identifying one or more road segments that fall at least partially within the area. The operations include receiving road segment attribute information about the one or more road segments. The operations include transmitting, from the communication transceiver to the computing device at the vehicle, information associated with one or more identified road segments and the road segment attribute information.

In a third claimed embodiment, a non-transitory computer-readable storage medium is claimed where a processor executes instruction out of a memory to perform a method for dynamic navigation. The method includes receiving a location from a computer at a vehicle. The method includes identifying, based on the location, an area that includes the location. The method includes identifying one or more road segments that fall at least partially within the area. The method includes receiving road segment attribute information about the one or more road segments. The method includes sending information associated with one or more identified road segments and the road segment attribute information to the computing device at the vehicle.

DETAILED DESCRIPTION

The present disclosure is directed to dynamically analyzing data and conditions associated with the movement of a vehicle. A processor or processing logic may evaluate vehicle location and speed information when identifying an amount of navigation data to send to a computer at a vehicle. The amount of information sent to the computer may vary based on the vehicle speed, a type of road that the vehicle is able to drive along, or may vary based on other attributes. The information sent to the computer may also relate to an area that the vehicle is anticipated to move through in a given time frame. Mapping data sent to the vehicle computer may be associated with a larger area when a vehicle is moving at a faster speed and may be associated with a smaller area when the vehicle is moving at a slower speed.

These methods and apparatus are directed to a form of dynamic drive analysis that may receive a location from a computing device associated with a vehicle. This location may optionally be identified using a global navigation satellite system (GNSS) receiver at the vehicle computing device. An area that includes the location may be identified and associated with a geometric shape. This area may be associated with a radius around an identified vehicle location when a preferred geometric shape is a circle. One or more road segments falling at least partially within the area may then be identified. Attribute information relating to identified road segments near a vehicle may also be identified. This road segment attribute information may include speed limits, road conditions, current average vehicle speed, or other information. Once identified information relating to the identified road segments and road segment attribute information may be sent to a computer at a vehicle. The information sent to the vehicle computer may optionally include attribute-related alerts that could advise a driver to slow down or perform some other action that increases safety.

Figure 1:
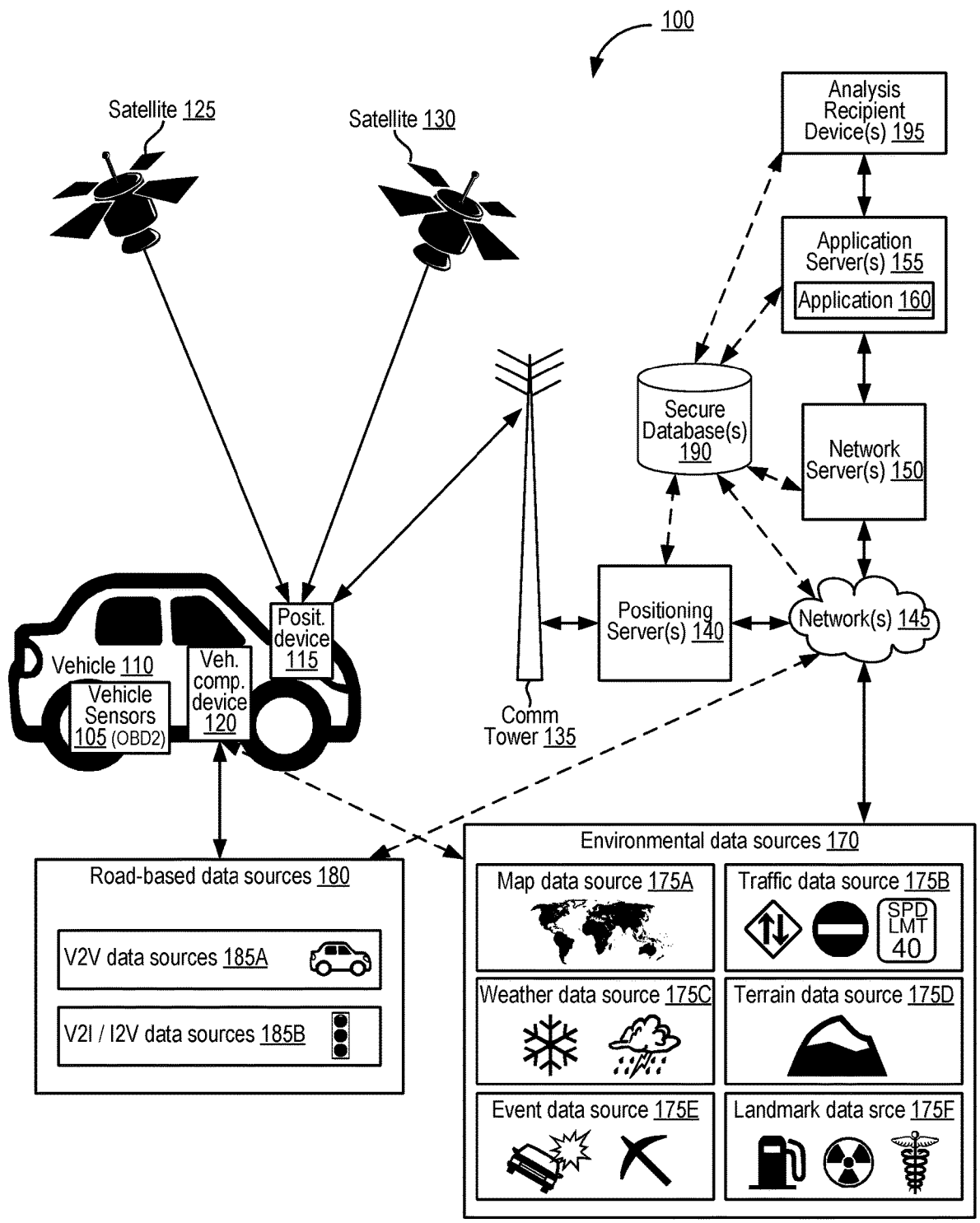
FIG. 1 illustrates elements that may be included in a system that collects and retrieves information about vehicles, infrastructure, environments, and drivers.

FIG. 1 illustrates elements that may be included in a system that collects and retrieves information about vehicles, infrastructure, environments, and drivers. The system 100 of FIG. 1 includes vehicle 110, positioning device 115 (that may include a GNSS receiver), vehicle computing device 120, vehicle sensors 105, GNSS positioning satellites 125 and 130, communications tower 135, positioning server 140, network 145, network server 150, application server 155, secure databases 190, recipient devices 195, environment data sources 170, and road-based data sources 180. A processor at application server 155 may execute instructions of application program 160 when evaluating data from various sources. The instructions of application program 160 may allow a processor to identify an optimal amount of data to be provided to vehicle positioning device 115 or to computer 120 per unit time. This may allow application server 155 to optimize an amount of available bandwidth used to communicate with computer navigation systems at particular vehicles.

Even though vehicle 110 is illustrated in FIG. 1 as an automobile, vehicle 110 may be any type of vehicle that travels on or through any type of throughway. As such, vehicle 110 may travel via roads, waterways, airways, rail, or other throughways. The terms "road" or "street" as used herein may include public roads, private roads, toll roads, highways, freeways, residential streets, driveways, bridges, off-road trails, bike lanes, or pathways. A land-based vehicle may be an automobile, a semi-truck, a shipping truck, a motorcycle, a bicycle, a tricycle, a scooter, a sidecar, a rickshaw, an auto rickshaw, a pedicab, or combinations thereof. Other vehicles that may be provided navigation data may include boats, airplanes, helicopters, or trains.

Figure 4:
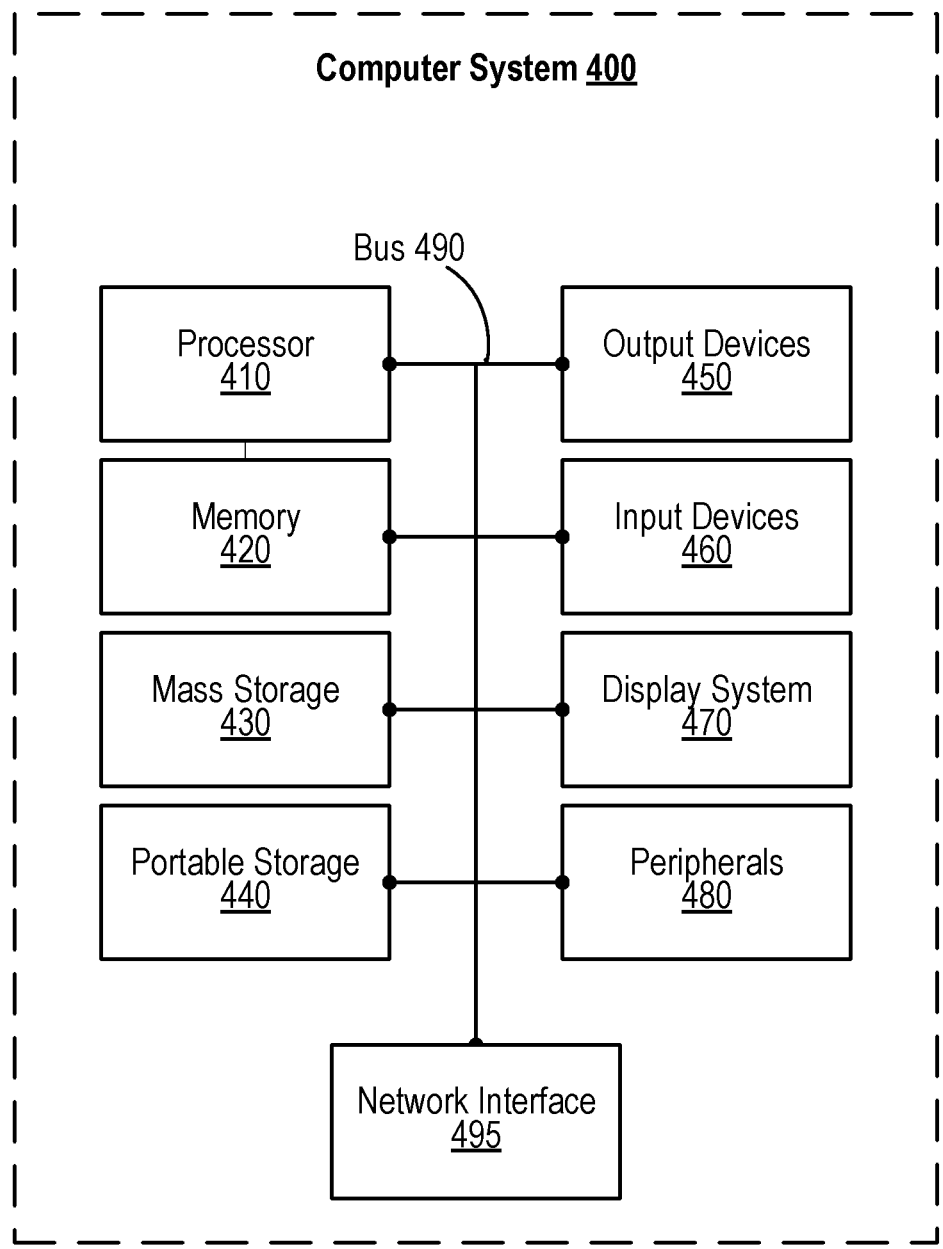
FIG. 4 illustrates an exemplary computing system that may be used to implement methods consistent with the present disclosure.

The vehicle computing device 120 associated with the vehicle 110 may include one or more computing devices, such as the computing devices illustrated in FIG. 4. In some cases, the vehicle computing device 120 includes a computing device built into the vehicle 110, for example a dashboard computing device, a cab-facing camera recording device, a road-facing camera recording device, or some combination thereof. In some cases, the vehicle computing device 120 may be a mobile device, such as a smartphone, which may be associated with a driver of vehicle 110 and/or with the vehicle 110 itself. Once located in or on vehicle 110, vehicle computing device 120 may provide instructions to a driver when tracking a location of the vehicle 110 as it moves toward a destination. The vehicle computing device 120 may be electrically coupled to the vehicle 110 via an audio cable with an audio jack and/or audio port, a lightning cable with a lightning jack and/or lightning port, a universal serial bus (USB) cable with a USB jack and/or USB port, any other type of cable or wired connection discussed with respect to the computing device 400 of FIG. 4. The vehicle computing device 120 may be wirelessly coupled to the vehicle 110, for example via a Bluetooth connection, a Wi-Fi connection, a wireless local area network (WLAN) connection, any other type of wireless connection discussed with respect to the computing device 400 of FIG. 4.

The vehicle 110 may include a positioning device 115 that may include one or more GNSS receivers that receive signals from communication satellites 125 and 130. Positioning device 115 may further communicate with a wireless, data, or cellular communication system via communications tower 135 directly or via the vehicle computing device 120. Positioning device 115 may receive signals from one or more positioning satellites 125 and 130 and determine its geographic location based on the received signals. This process may include identifying latitude and longitude coordinates, comparing them to map data that is stored at the positioning device 115, and evaluating mapping data from positioning server 140. Positioning device 115 may, thereby, identify its own position not only using latitude and longitude coordinates, but along particular roads, waterways, airways, or other throughways using other location metrics. The positioning device 115 may be coupled to, secured within, or otherwise disposed on or in vehicle 110. Positioning device 115 may, thereby, determine a location of the vehicle 110 by identifying a location of the positioning device 115. The positioning satellites 125 and 130 may be part of the US-based Global Positioning System (GPS), the Russia-based Global Navigation Satellite System (GLONASS), the China-based BeiDou Navigation Satellite System (BDS), the Europe-based Galileo GNSS, another GNSS system, or combinations thereof. Ideally, at least three satellites would be used to triangulate the location of vehicle 110 as it moves. In some cases, a location may be estimated based on signals from one or two satellites, even though this may be less precise or take longer than using signals from three or more satellites.

While FIG. 1 illustrates GNSS satellites 125 and 130, it should be understood that the positioning device 115 need not include a GNSS receiver, but may instead identify its position based on receipt of one or more signals from surface-based signals whose sources have known locations. For example, signals from one or more cellular or radio communication towers 135 may be used to identify where vehicle 110 is located at a moment in time. Ideally, at least three surface-based signal sources would be used to make triangulation possible, though in some cases, a location estimate may be determined from one or two signal sources. In some cases, signals from a combination of surface-based and satellite-based sources may be used for estimating a location. This may include refining a GPS-based position based on proximity to one or more beacons or WLAN access points with known locations. In some cases, a location may be estimated without direct use of GNSS receivers, surface-based signal triangulation, or any other such information source, but instead simply based on prior knowledge or estimation of where the vehicle is supposed to be. When a vehicle is traveling along a road that leads into a tunnel into which GNSS or surface-based positioning signals cannot reach, the vehicle's location can be estimated based on its last known vehicle position, speed, and heading. In such an instance, a last known location of vehicle 110 may be estimated based on how much time has elapsed since a last known vehicle location was identified, based on traffic patterns in the area (e.g., in the tunnel), or based on some combination thereof. Alternately, the computing device 120 or another device in vehicle 110, or another server system, may have data from which the location of vehicle 110 may be estimated. Vehicle locations may be estimated based on a driving route previously selected by or recommended to a driver.

Positioning device 115 may communicate with positioning server 140 or application server 155 directly or through vehicle computing device 120. These communications may be sent via a cellular communication network using communications tower 135. In such instances, computing device 120 may receive and convey location information via a cellular communication network. This positioning or location data may be conveyed by identifying latitude/longitude coordinates, using one or more street names, using one or more street addresses, using one or more region names (e.g., for a city, county, town, village), using another positioning metric, or some combination thereof. Positioning device 115 may alternately or additionally communicate this positioning or location data either on its own or through vehicle computing device 120 via radio frequency signals, wireless local area network (WLAN), 802.11 Wi-Fi, microwave frequency signals, or combinations thereof.

Positioning device 115 may be attached to and/or secured within the vehicle 110, as in a dashboard navigation computer. Positioning device 115 may be included within a vehicle computing device 120 disposed within the vehicle, such as a GNSS receiver and/or positioning chipset within a smartphone or tablet device. The positioning device 115 may be associated with the vehicle 110, an owner of the vehicle, the driver of the vehicle, an employer of the driver of the vehicle, a passenger within the vehicle, an employer of the passenger of the vehicle, a law enforcement entity, or a combination thereof. Likewise, the vehicle computing device 120 may be associated with the vehicle 110, an owner of the vehicle, the driver of the vehicle, an employer of the driver of the vehicle, a passenger within the vehicle, an employer of the passenger of the vehicle, a law enforcement entity, or a combination thereof.

Communications tower 135 may communicate information that identifies the location of vehicle 110 to positioning server 140, network server 150, and/or application server 155. The positioning server 140 of FIG. 1 may be a server associated with a particular GNSS, may be a map/navigation server that provides map data, or a combination thereof. Even though cellular networks and communication systems are discussed herein, other communication networks may be used to send location data, GPS data, and vehicle/driver identity data to a server that executes instructions of application program 160. Data sent to a server may be sent via one or more satellites in locations where cellular communications are not available. An airplane flying over the Pacific Ocean or a ship sailing in the Pacific Ocean may send location information to a server via a satellite based on the absence of any cellular communication towers in the Pacific Ocean.

Network server 150 may communicate with positioning server 140 directly through a communication network 145. Communication network 145 may be a local area network (LAN), a wide area network (WAN), or the Internet. Application server 155 may communicate with network server 150, positioning server 140, and/or the communication tower 135 through a LAN, WAN, or the Internet. Network server 150 may be implemented as one or more servers implementing a network service. The network server 150 may receive positioning data, perform preliminary processing on that received data, and provide the positioning data to application server 155. Positioning server 140, network server 150, and application server 155 may be implemented using one or more computing devices as discussed below with respect to FIG. 4.

Network 145 may facilitate communication of data between different servers, devices and machines, such as positioning server 140, network server 150, and application server 155. The network may be implemented, for example, as a private network, public network, intranet, the Internet, a wide area network (WAN), a local area network (LAN), a wireless local area network (WLAN), or combinations thereof.

Application server 155 may be implemented as one or more server computing devices, and includes computer program instructions corresponding to application program 160. Such instructions may be executed by one or more processors of the application server 155 when methods consistent with the present disclosure are performed. Program code associated with application 160 may allow server 155 to evaluate position data received from positioning device 115 or vehicle computing device 120. The execution of instructions associated with application 160 may then allow application server 155 to process the positioning data along with other geo-data when the behavior of a vehicle or driver are identified or evaluated.

Vehicle and/or driver behavior data may be stored in a secure database 190 or other data structure. This data may be stored on any kind of memory 420, mass storage 430, or portable storage 440 of FIG. 4, or another non-transitory computer-readable storage medium by the application server 155. Operations associated with application program 160 may also perform analysis using data stored in database 190. Such analysis may identify a status of a vehicle, may identify a driver behavior, and/or may identify a status of an environment surrounding vehicle 110. Results of such analysis may then be sent to one or more recipient devices 195 in a manner consistent with operations discussed in respect to FIG. 2. The one or more recipient devices 195 may include one or more intermediate recipient devices 195 that then optionally process received analysis information. A first recipient device may send analysis data further to a second or to several other recipient devices. In some cases, recipient devices 195 may include the vehicle computing device 120 associated with vehicle 110. Recipient devices 195 may include devices associated with a driver, a driver's employer or contractee, a driver's auto insurance carrier, a driver's health insurance carrier, an employer or contractee's insurance carrier, a vehicle manufacturer, a vehicle distributor, a vehicle fleet manager or administrator, a law enforcement entity, or a combination thereof.

Vehicle 110 may include, or have coupled thereto, one or more vehicle sensors 105 and/or interfaces, which may include diagnostic sensors and corresponding interfaces such as on-board diagnostics (OBD) implementations. Devices implementing such on-board diagnostics may access vehicle sensors 105 when diagnostics are performed. OBD tests may be implemented using Assembly Line Diagnostic Links (ALDL), OBD-I, OBD-1.5, OBD-II, Multiplex OBD (M-OBD), European OBD (E-OBD), Japan OBD (J-OBD), Australian Design Rule 79/01 (ADR 79/01), ADR 79/02, variants thereof, or combinations thereof. The one or more vehicle sensors 105 may sense data about vehicle maintenance, oil level, headlight functionality status, brake pad functionality status, brake light functionality status, battery level, battery charge rate, tire pressure, estimated/actual tire wearing status, time since last tire replacement, time since last oil change, time since last brake pad replacement, time since last tire rotation, odometer mileage, seatbelt functionality status, airbag functionality status, number of major collisions detected by accelerometers, number of minor collisions detected by accelerometers, time since last maintenance, number of major repairs, number of minor repairs, steering column integrity, chassis integrity, vehicle temperature, engine status, vehicle top speed reached, intake air temperature, fan functionality status, air conditioning functionality status, heating functionality status, engine coolant temperature, freeze detection status, overheating detection status, oxygen sensor status, warm-ups since codes cleared, distance travelled since codes cleared, warm-ups overall, distance travelled overall, fuel tank level, absolute barometric pressure, catalyst temperature, ambient air temperature, throttle position, fuel-air ration, time since trouble codes cleared, fuel type, ethanol fuel percentage, vapor pressure, fuel pressure, fuel injection timing, engine fuel rate, driver's demand pressure, engine torque, engine coolant temperature, intake air temperature, fuel pressure, inlet pressure, rotations per minute (RPM) history, wastegate control, filter functionality status, engine runtime history, engine friction, boost pressure, turbocharger pressure, NOx pressure, estimated/actual fuel efficiency, and similar measurements. Data from the vehicle sensors 105 may be read by the vehicle computing device 120 and sent through to communication tower 135 and network 145 to application server 155, which may use data from the vehicle sensors 105 as part of the analyses discussed with respect to FIG. 2 and FIG. 3. Alternatively or additionally, vehicle sensors 105 may be optimized to collect data regarding the operation of an electric or a hybrid vehicle.

The vehicle sensors 105 may include one or more of any of the following types of sensors: accelerometers, gyroscopes, gyrometers, barometers, magnetometers, compasses, inertial navigation systems (INSs), inertial measurement units (IMUs), inertial reference systems (IRSs), inertial reference units (IRUs), GNSS sensors, brake wear indicators, brake sensors, still image cameras, video cameras, microphones, horn honk usage/pressure sensors, night vision cameras/sensors, rear vision cameras, blind spot detection cameras/sensors, collision sensors, side curtain sensors, steering angle sensors, airbag sensors, wheel speed sensors, cross traffic alert sensors, automatic brake actuator sensors, laser rangefinders, RADAR sensors, LIDAR sensors, active park assist sensors, tire pressure sensors, infrared pedestrian detection/warning sensors, automatic speed control device (ASCD) sensors, lane departure detection sensors, adaptive cruise control sensors, mass air flow (MAF) sensors, engine speed sensors, oxygen sensors, manifold absolute pressure (MAP) sensors, spark knock sensors, fuel temperature sensors, thermometers, thermistors, photoresistors, phototransistors, voltage sensors, voltmeters, ammeters, multimeters, accelerator pedal sensors, brake fluid pressure sensors, barometric pressure sensors, air bag impact sensors, air charge temperature sensors, air cleaner temperature sensors, camshaft position sensors, coolant temperature sensors, crankshaft position sensors, exhaust gas recirculation (EGR) position sensors, EGR valve pressure sensors, engine crankcase pressure sensors, engine rotations per minute (RPM) sensors, engine variable sensors, exhaust temperature sensors, fuel injection pressure sensors, fuel injection timing sensors, heater core temperature sensors, hybrid phase current sensors, ignition misfire sensors, ignition pass-lock sensors, knock (detonation) sensors, power door resistance sensors, fuel temperature sensors, turbo boost sensors, tail light outage sensors, tachometer sensors, suspension yaw sensors, suspension position sensors, throttle position sensors, top dead center (TDC) sensors, tire pressure monitoring sensors, vacuum sensors, vehicle transmission speed sensors, backup sensors, or combinations thereof.

The environmental data sources 170 may supply data to the application servers 155 through network 145, and may also optionally provide data to the vehicle computing device 120 and/or recipient device 195. The environmental data sources 170 may include one or more map data sources 175A (that provide maps of roads or other thoroughfares), one or more traffic data sources 175B (that provide data about traffic and speed limits and directional restrictions on roads or thoroughfares), one or more weather data sources 175C (that provide data about weather conditions in the sky and on roads), one or more terrain data sources 175D (that provide data about terrain and elevation and road types—e.g., paved, unpaved, asphalt, cobblestone, dirt, rocky, off-road), one or more event data sources 175E (that provide data about accidents and construction zones and street festivals and other events that might disrupt or slow driving), one or more landmark data sources 175F (that provide data about buildings and gas stations and hazardous areas), or combinations thereof. Data from the environmental data sources 170 may be sent through network 145 to application server 155, which may use data from the environmental data sources 170 as part of an analysis of environmental status.

The road-based data sources 180 may include vehicle-to-vehicle (V2V) data sources 185A. As such, V2V data sources 185A may allow for data to be received by the vehicle 110 (or by the vehicle computing device 120) that was sent from other vehicles (or corresponding mobile devices). The road-based data sources 180 may include infrastructure-to-vehicle (I2V) data sources 185B. Data may be received from I2V data sources 185B by any device associated with vehicle 110 (e.g. vehicle computing device 120). I2V data sources may include, yet are not limited to roadside infrastructure, sensors mounted on traffic lights or street signs, or cameras that acquire images of a roadway. The road-based data sources 180 of FIG. 1 include infrastructure-to-vehicle (I2V) data sources 185B and V2V data sources 185A. V2V data sources 185A include, yet are not limited to computing devices located at one or more other vehicles. Data may be sent from a vehicle to infrastructure located along a roadway according to a vehicle to infrastructure (V2I) communication convention. Alternatively or additionally data may be relayed through communication devices located along a roadway according to an infrastructure to vehicle (I2V) communication convention. Examples of V2V data, I2V data, and V2I data may include data captured by cameras, positioning devices, proximity sensors, vehicle sensors, environment sensors, and the like. Any of the data types or sensor types discussed with respect to vehicle sensors 105 and/or environmental data sources 170 may be conveyed by the road-based data sources 180 to other vehicles or to application server 155, positioning server 140, or network server 150. The road-based data sources 180 are illustrated communicating to the vehicle computing device 120 or data from the road-based data sources 180 may be communicated directly to the application servers 155 through network 145.

All of the devices illustrated in FIG. 1—including vehicle 110, positioning device 115, vehicle computing device 120, vehicle sensors 105, GNSS positioning satellites 125 and 130, communications towers 135, positioning servers 140, network 145, network servers 150, application servers 155, secure databases 190, recipient devices 195, environment data sources 170, and road-based data sources 180—may be implemented using the computing devices illustrated in FIG. 4 or in FIG. 5. Any of these elements, as well as any data provided by, received from, received by, or otherwise associated therewith, may optionally be provided by, be owned by, or otherwise be associated with one or more telematics service providers (TSP). Furthermore, the one or more secure databases 190 may store data received from any combination of vehicle 110, positioning device 115, vehicle computing device 120, vehicle sensors 105, GNSS positioning satellites 125 and 130, communications towers 135, positioning servers 140, a network 145, network servers 150, application servers 155, secure databases 190, recipient devices 195, environment data sources 170, and road-based data sources 180.

Figure 2:
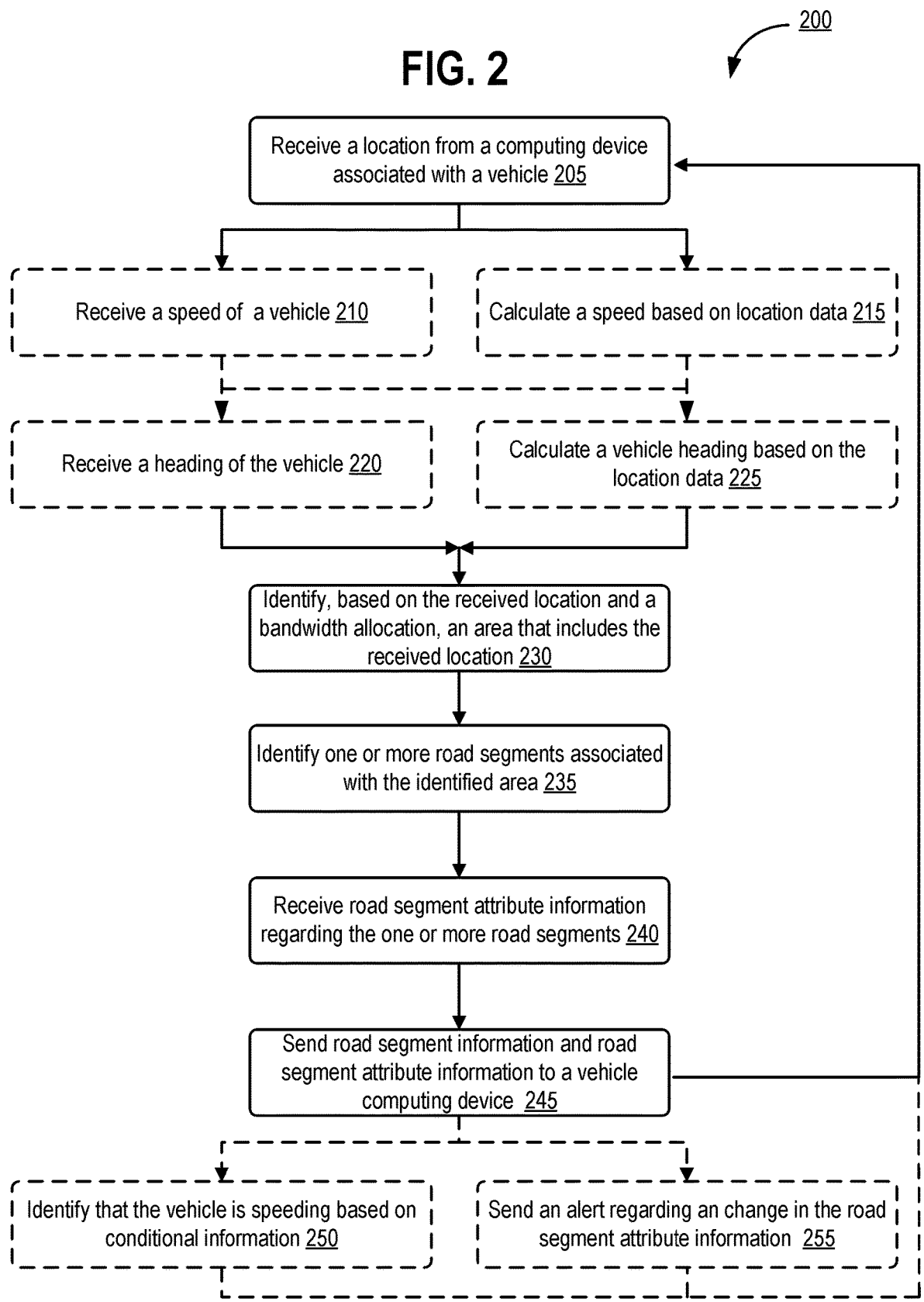
FIG. 2 is a flow diagram illustrating operations that may be performed when mapping data is provided to a vehicle navigation computer.

FIG. 2 is a flow diagram illustrating operations that may be performed when mapping data is provided to a vehicle navigation computer. The flow diagram 200 of FIG. 2 includes a number of operations described from the perspective of the application server 155, the network server 150, the positioning server 140, the secure database 190, the computing device associated with the vehicle 120, another computing device 400, another computing device 500, or some combination thereof. That is, while the steps are described below as being performed by the application server 155, it should be understood that some of these steps may be performed by another one or more of the above-listed computing devices and/or systems.

At step 205 of FIG. 2, the application server 155 receives a location from a vehicle computing device 120. Alternatively, the location received in step 205 may be received from a third-party vehicle location and routing service associated with vehicle 110 of FIG. 1. The location of a vehicle may be identified by positioning device 115 of the vehicle 110. The location of a vehicle may be performed by a GNSS receiver as discussed with respect to FIG. 1.

Note that program flow may move from step 205 to either optional step 210 or optional step 215 of FIG. 2 depending on a way in which a vehicle speed is identified. At optional step 210, the application server 155 may receive a speed of vehicle 110 from the vehicle computing device 120. The speed may optionally be determined by vehicle computing device 120 based on multiple locations retrieved by positioning device 115 and based on timestamps associated with those multiple locations. A speed or acceleration of a vehicle may be determined by the vehicle computing device 120 based on vehicle sensors 105. Speed or acceleration sensors may include a speedometer, an accelerometer, a gyroscope, an inertial measurement unit (IMU), or some combination thereof.

At optional step 215, the application server 155 calculates the speed of the vehicle 110 using information received from roadway infrastructure. Data received from transmitters alongside a road by positioning device 115 may be sent to application server 155 from the vehicle computing device 120. In such instances, a sensor located along the roadway may send data to a vehicle computer when a vehicle passes the sensor. Data received from infrastructure transmitters may be timestamped. When the vehicle passes a second sensor located alongside the roadway, additional data may be received from the second sensor. Timestamps associated with each of these locations along with distance data may be used to calculate a speed of the vehicle. Alternately or additionally, step 210 or step 215 may concern the application server's 155 receipt of and/or identification of other characteristics of the vehicle 110, such as velocity, momentum, acceleration, deceleration, or some combination thereof.

Program flow may move from either step 210 or step 215 to either step 220 or step 225 of FIG. 2. At optional step 220, the application server 155 may receive a heading of the vehicle 110 from the vehicle computing device 120. The speed may optionally be identified by the vehicle computing device 120 based on multiple locations retrieved by the positioning device 115 of vehicle 110 and based on one or more distances separating those locations. The heading may optionally be determined by the vehicle computing device 120 based on vehicle sensors 105. Here again, sensors at a vehicle may include a speedometer, an accelerometer, a gyroscope, an inertial measurement unit (IMU), or some combination thereof.

When program flow moves to optional step 225, the application server 155 may calculate or identify a heading of vehicle 110. This identification may be based on multiple locations retrieved by the positioning device 115. After positioning device 115 receives location information, computing device 120 may send location data to application server 155. Server 155 may identify the vehicles heading by comparing location data associated with the multiple locations. Alternately or additionally, step 220 or step 225 may concern the application server 155's receipt of and/or identification of other characteristics of the vehicle 110. These other characteristics may include a direction, a bearing, a pitch, a yaw, a course, or some combination thereof.

Figure 3:
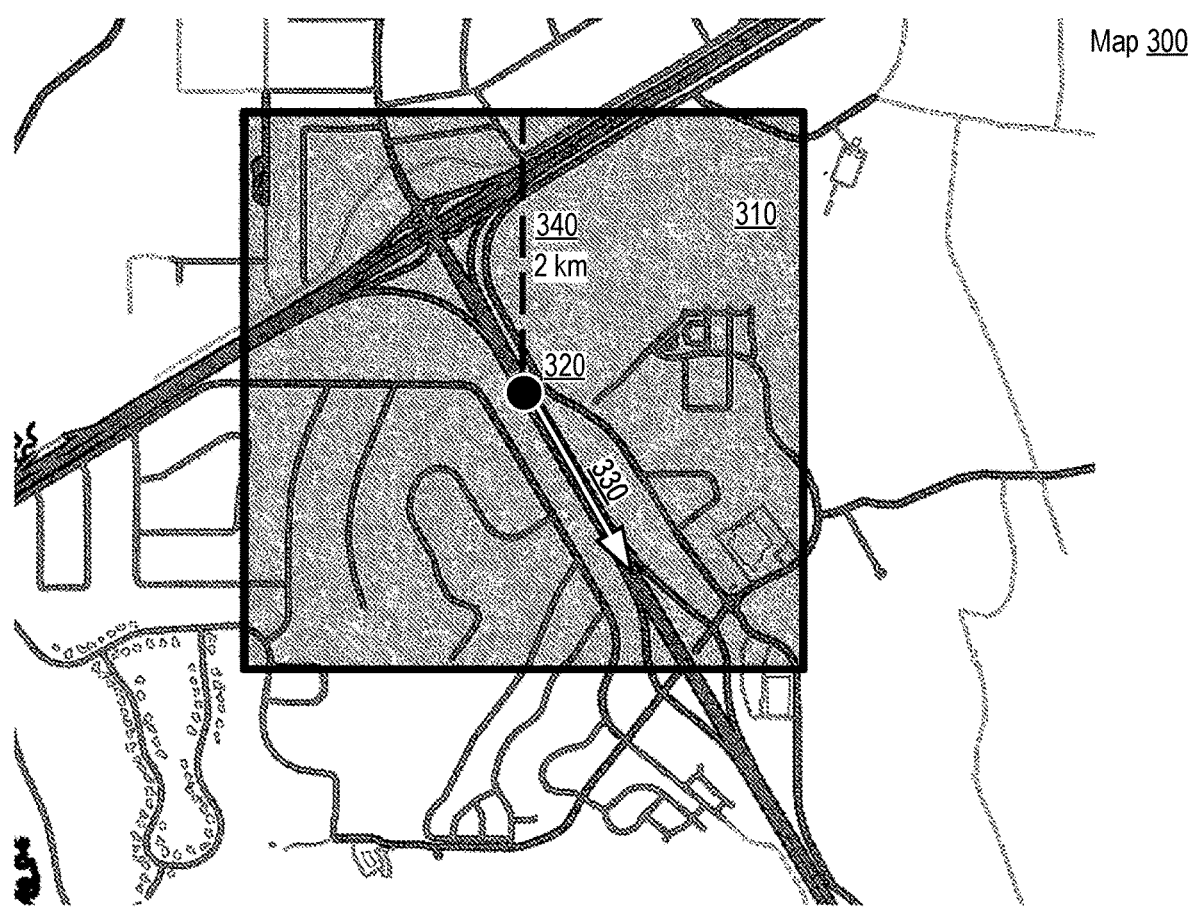
FIG. 3 illustrates a map of an area that includes a vehicle location and multiple road segments.

At step 230, the application server 155 may identify an area associated with a vehicle location. The area may be identified using the location received in step 205 of FIG. 2. The area may also be identified based on a bandwidth allocation. An example of the area identified in step 230 is illustrated in FIG. 3. The area may include at least a radius of a predetermined length around a vehicle location, the identified area may have a shape that is circular or another geometric shape (e.g. a square or other quadrilateral shape as illustrated in FIG. 3).

A size of the area may be identified based on the speed of the vehicle. The application server 155 may calculate a distance that the vehicle can reach within a predetermined or specified period of time using the speed of the vehicle. This distance may be determined using the equation distance=rate·time. The application server 155 may generate the area according to a formula and a specified area shape. When the specified area shape is a circle, the area may be associated with the vehicle location and a radius, where the radius corresponds to a distance that the vehicle travelling at the speed (identified at step 210 and/or 215) will travel over a specified time period. The radius may be determined based on the distance that the vehicle traveling at the speed will travel in a straight line over the specified time period. The radius may be determined based on the distance that the vehicle traveling at the speed will travel along the road(s) that the vehicle is currently traveling on over the specified time period. Where the specified area shape is a specified type of polygon such as a square, a triangle, a pentagon, a hexagon, or another polygon, the shape of the area may be the smallest polygon of the specified type of polygon within which a circle with the determined radius may fit inside. In some cases, application server 155 may compare the speed of the vehicle 110 to a predetermined speed threshold (e.g., 20, 30, 40, 50, 60, or 70 MPH), and may generate the area so that the area is of a first predetermined size when the speed is below the predetermined speed threshold. The application server 155 may similarly generate the area so that the area is of a second predetermined size when the speed exceeds the predetermined speed threshold, the second predetermined size being larger than the first predetermined size. In some cases, multiple predetermined speed thresholds may be used, in which case more than two predetermined sizes may be used depending on which of several ranges of speeds the speed of the vehicle 110 falls into. Based on the vehicle speed and the closest predetermined speed threshold, application server 155 and may identify the area using a lookup table. Because of this, the area identified in step 230 of FIG. 2 may be larger when the speed of the vehicle 110 is high than when the speed of the vehicle 110 is low.

At step 235, the application server 155 identifies one or more road segments that fall at least partially within the identified area. To do so, the application server 155 may locate one or more road segment vertices near a current location of the vehicle. In such an instance, all road segment vertices located within a predetermined or specified distance of the vehicle may be identified. In some cases, step 235 may be an optional step, as zero road segments may be identified.

Alternately or additionally road segments may be identified based on routing algorithms. For example, when vehicle 110 is on an arterial roadway, the system could assume that the vehicle will stay on an arterial class of road. When the vehicle will merge onto a "higher" class of road like a freeway or highway, road segments matching the same class of road or higher can be returned to a computing device of a vehicle. Mapping or road segment information may be associated with speeds, roadway types, or changes in a type of roadway within a specified or preferred distance (e.g. 5 miles down the road). In some cases, certain "low" classes of road, such as dirt paths or gravel roads, may be filtered out of the data or data may simply not be retrieved. This filtering or non-retrieval roadway information will reduce an amount of mapping data that need to be sent to a vehicle computer. This may help reduce a total amount of data that need be sent to the vehicle computer. Systems and methods consistent with the present disclosure may reduce a total amount of bandwidth required by not sending irrelevant data to a vehicle computer. This may also help insure that vehicles avoid roads that may not be suitable for their class of vehicle. When a large truck is driving to a destination, mapping data associated with small windy roads may not be sent to a navigation computer of that large truck to prevent the truck from driving down a roadway not suitable for large truck traffic. Such navigation filtering may also provide mapping data to vehicles based on total vehicle weight. Mapping data that includes areas behind a vehicle may not be sent to the vehicle to further limit an amount of data sent to a vehicle computer.

At step 240, the application server 155 receives road segment attribute information about the one or more road segments identified at step 235. The road segment attribute information may include speed limits of each of the one or more road segments located within the area identified in step 230. The road segment attribute information may also identify a road name, a road type, a road material, a number of lanes, a lane width, or a distance to a next road segment vertex. Road segment attribute information may also identify whether a road is urban or whether a road has controlled access. Roadways may be identified by a unique identifier or alias for the road. Each road segment may be associated with a list of points or vertices of road segments, a direction of travel (one-way or two-way), or with an indication that identifies whether the road is paved. Other road segment information may be related to current or historic average speed of vehicles on the road, a width of road, a length of road, a quality/frequency of lane markings/signage/signals along the road, a road condition, obstacles, construction status, local weather, traffic, time of day, temperature, humidity, air pressure, wind speed, wind direction, altitude, slope, direction, one-way or two-way road, surroundings, soil type, landslide risk, flood risk, nearby structures, air pollution, local wildlife, air quality, fog/mist, allergens, cellular network reception, radio reception, icing risk, presence of de-icing chemicals, tire chain requirements, any data from a road-based data source 180, any data from an environmental data source 170, or some combination thereof.

In some cases, the road segment attribute information may be expressed as lines corresponding to the road segments themselves. These lines may include largely one-dimensional shapes, two dimensional curved shapes, or may include angled portions with one or more vertices. In some cases, the road segment attribute information may be expressed as two-dimensional geo-fenced areas in the form of a geometric shape (e.g., triangles, quadrilaterals, pentagons, hexagons, heptagons, octagons, nonagons, decagons, portions thereof, or portions and/or combinations thereof) or rounded shapes (e.g., circles, ellipses, or portions and/or combinations thereof). Two-dimensional shapes may at least partially encompass certain road segments.

At step 245, the application server 155 sends at least the one or more road segments identified at step 235 and the road segment attribute information identified at step 240 to the vehicle computing device 120. This information may also be sent to a third-party vehicle and routing service associated with vehicle 110 of FIG. 1. Program flow may move from step 245 to either step 250 or to step 255 of FIG. 2. At optional step 250, the application server 155 identifies that the vehicle 110 is speeding based on the speed of vehicle (e.g., as determined at step 210 and/or step 215) and a speed limit of road segment along which the vehicle is moving. Alternatively a "speed limit" may correspond to a setting (or effective speed limit) set by or associated with a vehicle that is different from an official speed limit set by government.

Determination step 250 may identify that a driver is driving too fast for a given weather condition, time of day, driving behavior as compared to other drivers, or driver personalization. Application server 155 may compare the speed of the vehicle 110 to a speed limit or setting on a first road segment corresponding to the received location in step 250. The speed limit may further be altered based on weather conditions, a time of day, driving behavior, or personal driver information. An effective speed limit may be reduced from the posted speed limit in poor weather conditions, such as rain, snow, ice, or fog. The effective speed limit may be reduced from the posted speed limit at night. The effective speed limit may be raised from the posted speed limit if the current or historical average speed of vehicles on that road segment is higher than the posted speed limit, or may be reduced from the posted speed limit if the current or historical average speed of vehicles on that road segment is lower than the posted speed limit. The effective speed limit may be raised from the posted speed limit when the driver, the vehicle, or the environment are determined to be safer than an average driver, vehicle, or environmental condition. The effective speed limit may be reduced from the posted speed limit when the driver, vehicle, or environment are determined to be riskier (less safe) than an average driver, vehicle, or environmental condition.

In step 250 of FIG. 2, application server 155 may send an alert to the vehicle computing device 120 identifying that the vehicle 110 is speeding based on the posted speed limit, the effective speed limit, or both. A score may be calculated based on historical risk factors that may identify how many accidents the driver has been in compared to an average number or threshold number of accidents. The driver's score may also be calculated based on how many at-fault accidents the driver has been in compared to an average number of at-fault accidents of other drivers. Alternatively or additionally, a driver's score may correspond to how many speeding tickets the driver has received as compared to an average number of speeding tickets received by other drivers. Other factors that may be included in calculating a driver's score may include a number of parking tickets the driver has received, speeding behavior (that may be based on vehicle sensors 105 compared to average speeding behavior), harsh braking behavior (that may be based on data collected by vehicle sensors 105 as compared to an average amount of harsh braking behavior), how long the driver has been driving without rest, or may be based on any other driver trait discussed herein, or some combination thereof. How risky or safe a vehicle is compared to the average vehicle may also be identified by a vehicle safety score. A vehicle safety score may be calculated based on how many accidents the vehicle has been in compared to an average number of accidents of other vehicles. The vehicle safety score may be calculated based on historical vehicle maintenance data or on data that identifies a severity of an accident. Such vehicle maintenance data may identify when the vehicle was most recently taken in for maintenance, when the vehicle was most recently repaired, when the vehicle was most recently taken in for an oil change, when the vehicle was most recently taken in for tire rotation, how many repairs have been made on the vehicle as compared to an average number of repairs, the age of the vehicle, any other vehicle trait discussed herein, or some combination thereof. How risky or safe an environment is may be identified based on an environment score. An environment score may be calculated based on whether it is currently night or day in the environment, how many lanes are present on the road, whether it is raining or not, whether it is windy or not, whether it is dusty or not, whether it is snowing or not, whether it is hailing or not, whether the road is icy or not, whether the road is paved or not, any other environmental condition discussed herein, or some combination thereof. The effective speed limit may additionally or alternately be reduced or otherwise adjusted by a device associated with an administrative or fleet management entity, such a device may be associated with an employer or fleet manager of the driver.

At optional step 255, the application server 155 sends an alert to the vehicle computing device 120 regarding an upcoming change in an applicable road segment attribute. For example, the application server 155 can send an alert to the vehicle computing device 120 indicating that a change in speed limit (or any other attribute) is coming up within a threshold distance from the vehicle or within a threshold time (which may be a function of the vehicle's speed).

Application server 155 may only send data to a vehicle computer at steps 245, 250, and 255 of FIG. 2. The data sent to the vehicle data may correspond to the area identified in step 230. An amount of data sent to the vehicle computer may be limited to a distance that the vehicle should travel in a given amount of time based on a current speed of the vehicle. Mapping data sent to a vehicle computer may only include data associated with a current vehicle location and data associated with a roadway in front of the vehicle. Because of this, mapping data sent to a vehicle computer may correspond to small map of a few hundred feet as compared to a large map such as a citywide, statewide, nationwide, or global map. Thus, the data transmission from the application server 155 to the vehicle computing device 120 is lightweight and only requires a small amount of data to be sent to the vehicle computer at a moment in time. This can help, minimizing an amount of bandwidth required to send the mapping data to the vehicle computer. The approach is flexible and can be used with very simple vehicle computing devices 120 with limited memory. Vehicle computing devices 120 may not require any functionality associated with generating a map, may not include any functionality relating to navigating from one location to another location, or may not include an the ability to download or store relatively large amounts of mapping data. This could allow all mapping generation and routing identification functions to be performed by a server that sends image and possibly text or audio data to a computing device of a vehicle. As such, vehicle computing devices consistent with the present disclosure may only include minimal functionality without requiring true GNSS mapping or location functionality.

Step 205 may occur again following any of steps 245, 250, or 255. That is, the application server 155 may poll the vehicle computing device 120 periodically for the updated location of the vehicle 110, after which the rest of the process 200 can occur as discussed above. The polling may occur every N seconds or every N minutes where N may be an integer (e.g. 1, 2, 3, 4, 5, 6, 7, 8, 9, 10, 11, 12, 13, 14, 15, 16, 17, 18, 19, or 20). Alternately, the vehicle computing device 120 may periodically transmit its location without such polling, or the vehicle computing device 120 may poll the application server 155 to periodically query as to whether and/or when it should send its location to the application server 155.

Information received at steps 205, 210, and 220 may include a user or driver alias, which is a unique alphanumeric string that represents an individual user or driver. The information may include a vehicle type, such as truck, car, motorcycle, bicycle, scooter, watercraft, aircraft, and so forth. This information may also include location information (e.g. latitude and longitude data). The information may include speed of the vehicle in miles per hour (MPH) or kilometers per hour (KPH). The information may include compass direction or heading, represented in degrees, where 0 degrees represents North (or alternately 0 can represent South, West, or East).

FIG. 3 illustrates a map of an area that includes a vehicle location and multiple road segments. The area 310 illustrated within a map 300 of FIG. 3 may be identified at a server. The area illustrated in FIG. 3 includes location 320 of vehicle 110 of FIG. 1. A heading of the vehicle 110 is illustrated as a direction of an arrow 330 in FIG. 3. The length of the arrow 330 may correspond to a speed of the tracked vehicle. Note that the shaded area 310 of FIG. 3 is a square that is bounded by a solid black line. Note that the shaded area of FIG. 3 is centered on location 320 of vehicle 110. The sides of the square may correspond to a distance (e.g. 4 km in length and width). The area 310 may be associated with a distance 340 (which may be referred to as a radius 340) of 2 km around the location 320 of the vehicle 110 while the vehicle is traveling at a particular speed as identified by length of the arrow 330 of FIG. 3.

Every road segment (bit of road) in the area 310 that has a different trait from another road segment (bit of road). Because of this, each road segment illustrated in area 310 may have different attributes such as speed limit, road name, class of road (highway, freeway, arterial road, dirt path), number of lanes, direction, or any other attribute/trait discussed above. Furthermore, attributes associated with a subset of each of the different road segments may be identified based on one or more criteria. In some cases, an intersection of two roads may connect up to four road segments together, one for each road side of the intersection. In some cases, the road segment attribute corresponding to a road segment may identify one or more restrictions on driving along the road segment, such as a restriction on direction of driving (e.g., a one way road), a restriction on direction of turning (e.g., no left turn or no right turn), a restriction on speed (e.g., a speed limit), a restriction on vehicle weight (e.g., maximum weight), a restriction on vehicle height (e.g., maximum height), a restriction indicating a minimum number of passengers (e.g., a carpool or HOV lane), a restriction indicating a maximum number of passengers, a restriction on driving time (e.g., road closes during a specified time period), a restriction on type of cargo (e.g., no flammable cargo or otherwise hazardous cargo near a school or other specified zone), or some combination thereof. In some cases, any of the above-recited restrictions may be limited in applicability based on time, such as a "no right turn" restriction that only applies between 1 PM and 5 PM on weekdays, a road or lane that is carpool only between 9 AM and 6 PM every day, and so forth. The area 310 appears to include at least a portion of at least 28 road segments. Thus, given the area 310 illustrated in FIG. 3, the application server 155 may sent data identifying these 28 road segments and their corresponding attributes to the vehicle computing device 120 at step 245 of FIG. 2. Steps 250 and 255, on the other hand, may relate more to the road segment that a vehicle is currently driving on (or is closest to).

FIG. 4 illustrates an exemplary computing system that may be used to implement methods consistent with the present disclosure. Any of the computing devices, computing systems, network devices, network systems, servers, and/or arrangements of circuitry described herein may include at least one computing system 400, or may include at least one component of the computer system 400 identified in FIG. 4. The computing system 400 of FIG. 4 includes one or more processors 410 and memory 420. Each of the processor(s) 410 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 410 may include one or more cores, either integrated onto a single chip or spread across multiple chips connected or coupled together. Memory 420 stores, in part, instructions and data for execution by processor 410. Memory 420 can store the executable code when in operation. The system 400 of FIG. 4 further includes a mass storage device 430, portable storage medium drive(s) 440, output devices 450, user input devices 460, a graphics display 470, peripheral devices 480, bus 490, and network interface 495.

The components shown in FIG. 4 are depicted as being connected via a single bus 490. However, the components may be connected through one or more data transport means. Processor unit 410 and memory 420 may be connected via a local microprocessor bus 490, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing some aspects of the subject technology for purposes of loading that software into memory 420.

Portable storage device 440 operates in conjunction with a portable non-volatile storage medium, such as a floppy disk, compact disk or digital video disc, to input and output data and code to and from the computer system 400 of FIG. 4. The system software for implementing aspects of the subject technology may be stored on such a portable medium and input to the computer system 400 via the portable storage device 440.

The memory 420, mass storage device 430, or portable storage 440 may in some cases store sensitive information, such as transaction information, health information, or cryptographic keys, and may in some cases encrypt or decrypt such information with the aid of the processor 410. The memory 420, mass storage device 430, or portable storage 440 may in some cases store, at least in part, instructions, executable code, or other data for execution or processing by the processor 410.

Output devices 450 may include communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 470. The printer may be inkjet, laser jet, thermal, or some combination thereof. In some cases, the output device circuitry 450 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 450 may include any ports, plugs, antennae, wired or wireless transmitters, wired or wireless transceivers, or any other components necessary for or usable to implement the communication types listed above, such as cellular Subscriber Identity Module (SIM) cards.

Input devices 460 may include circuitry providing a portion of a user interface. Input devices 460 may include an alpha-numeric keypad, such as a keyboard, for inputting alpha-numeric and other information, or a pointing device, such as a mouse, a trackball, stylus, or cursor direction keys. Input devices 460 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 460 may include any ports, plugs, antennae, wired or wireless receivers, wired or wireless transceivers, or any other components necessary for or usable to implement the communication types listed above, such as cellular SIM cards.

Input devices 460 may include receivers or transceivers used for positioning of the computing system 400 as well and input devices 460 may be communicatively coupled to one or more sensors, such as vehicle sensors 105 of FIG. 1. These may include any of the wired or wireless signal receivers or transceivers that may receive or send data. Network interface A location of the computing system 400 can be determined based on signal strength of signals as received at the computing system 400 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 400 such as a router, modem, switch, hub, bridge, gateway, or repeater. These may also include Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 460 may include receivers or transceivers corresponding to one or more of these GNSS systems.

Display system 470 may include a liquid crystal display (LCD), a plasma display, an organic light-emitting diode (OLED) display, an electronic ink or "e-paper" display, a projector-based display, a holographic display, or another suitable display device. Display system 470 receives textual and graphical information, and processes the information for output to the display device. The display system 470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 480 may include any type of computer support device to add additional functionality to the computer system. Peripheral device(s) 480 may include one or more additional output devices of any of the types discussed with respect to output device 450, one or more additional input devices of any of the types discussed with respect to input device 460, one or more additional display systems of any of the types discussed with respect to display system 470, one or more memories or mass storage devices or portable storage devices of any of the types discussed with respect to memory 420 or mass storage 430 or portable storage 440, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

Network interface 495 may be used to send data to or receive data from other computing devices. These communications may be sent via communication tower 135 or may be communicated via network 145 of FIG. 1. Network interface 495 may be any computer communication network standard in the art.

The components contained in the computer system 400 of FIG. 4 can include those found in computer systems that may be suitable for use with some aspects of the subject technology and represent a broad category of such computer components. That said, the computer system 400 of FIG. 4 can be customized and specialized for the purposes discussed herein and to carry out the various operations discussed herein, with specialized hardware components, specialized arrangements of hardware components, and/or specialized software. Thus, the computer system 400 of FIG. 4 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 400 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 400 may also use a Basic Input/Output System (BIOS) or Unified Extensible Firmware Interface (UEFI) as a layer upon which the operating system(s) are run.

In some cases, the computer system 400 may be part of a multi-computer system that uses multiple computer systems 400, each for one or more specific tasks or purposes. The multi-computer system may include multiple computer systems 400 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 400 from different networks communicatively coupled together via the internet (also referred to as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 420, the mass storage 430, the portable storage 440, or some combination thereof. Such media can take many forms, including, but not limited to, non-volatile and volatile media such as optical or magnetic disks and dynamic memory, respectively. Some forms of non-transitory computer-readable media include FLASH memory, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L4), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 410 for execution. A bus 490 carries the data to system RAM or another memory 420, from which a processor 410 retrieves and executes the instructions. The instructions received by system RAM or another memory 420 can optionally be stored on a fixed disk (mass storage device 430/portable storage 440) either before or after execution by processor 410. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a device, machine, mechanism, computing system 400, and/or computing system 500 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of dynamic navigation, the method comprising:
   receiving a location on a road from a computing device that is coupled to a vehicle, wherein the road is categorized into a class of a ranked set of classes;
   identifying, based on the location and a bandwidth allocation, an area that includes the location;
   identifying one or more road segments that each fall at least partially within the area;
   receiving road segment attribute information about the one or more road segments;
   reducing a bandwidth amount used to communicate with a communication interface of the computing device that is coupled to the vehicle, by filtering data to:
      filter out irrelevant data to avoid sending the irrelevant data to the computing device that is coupled to the vehicle, and
      identify, for sending to the computing device that is coupled to the vehicle, a limited set of visual mapping data associated with the one or more road segments to send to the computing device that is coupled to the vehicle using a filter associated with the road segment attribute information, wherein the limited set of visual mapping data includes roads categorized no lower than the class of the road among the ranked set of classes; and
   sending, using a communication transmitter and according to the bandwidth allocation, the limited set of visual mapping data associated with the one or more road segments based on the filter associated with the road segment attribute information to the computing device that is coupled to the vehicle.

2. The method of claim 1, wherein the location is identified by the computing device that is coupled to the vehicle based on one or more signals received by a Global Navigation Satellite System (GNSS) receiver associated with the computing device.

3. The method of claim 1, further comprising receiving a speed of the vehicle from the computing device that is coupled to the vehicle.

4. The method of claim 3, further comprising calculating a distance that the vehicle is to reach by traveling at the speed over a predetermined period of time, wherein a radius of the area that includes the location is at least as long as the distance.

5. The method of claim 3, further comprising identifying that the speed is below a predetermined speed threshold, wherein a size of the area that includes the location is set to a first predetermined size based on the speed being below the predetermined speed threshold, wherein the first predetermined size is smaller than a second predetermined size corresponding to speeds exceeding the predetermined speed threshold.

6. The method of claim 3, further comprising identifying that the speed exceeds a predetermined speed threshold, wherein a size of the area that includes the location is set to a second predetermined size based on the speed exceeding the predetermined speed threshold, wherein the second predetermined size is larger than a first predetermined size corresponding to speeds below the predetermined speed threshold.

7. The method of claim 3, further comprising identifying that the vehicle is speeding by identifying that the speed exceeds a speed limit of a first road segment corresponding to the location, wherein the one or more road segments include the first road segment and the road segment attribute information includes the speed limit of the first road segment.

8. The method of claim 1, further comprising receiving a heading of the vehicle from the computing device that is coupled to the vehicle, wherein filtering the data to identify the limited set of visual mapping data is based on the heading of the vehicle.

9. The method of claim 8, wherein the area that includes the location includes more space around the location in a first direction corresponding to the heading than in a second direction opposite the heading.

10. The method of claim 1, wherein identifying the one or more road segments includes identifying one or more road segment vertices that fall within the area, wherein each of the one or more road segment vertices represents an end of one of the one or more road segments.

11. The method of claim 1, wherein the area that includes the location is associated with a radius of a predetermined length around the location.

12. The method of claim 1, wherein a size of the area is filtered based on the bandwidth allocation.

13. An apparatus for dynamic navigation, the apparatus comprising:
a communication transceiver;
a memory storing instructions; and
a processor that executes the instructions to:
receive, at the communication transceiver from a computing device that is coupled to a vehicle, a location,
identify, based on the location on a road and a bandwidth allocation, an area that includes the location and the road is categorized into a class of a ranked set of classes,
identify one or more road segments that each fall at least partially within the area,
identify road segment attribute information about the one or more road segments,
reduce a bandwidth amount used to communicate with a communication interface of the computing device that is coupled to the vehicle, by filtering filter data to:
filter out irrelevant data to avoid sending the irrelevant data to the computing device that is coupled to the vehicle, and
identify, for sending to the computing device that is coupled to the vehicle, a limited set of visual mapping data associated with the one or more road segments to send to the computing device that is coupled to the vehicle using a filter associated with the road segment attribute information, wherein the limited set of visual mapping data includes roads categorized no lower than the class of the road among the ranked set of classes, and
transmit, according to the bandwidth allocation and to the computing device that is coupled to the vehicle, the limited set of visual mapping data associated with the one or more road segments, the limited set of visual mapping data transmitted via the communication transceiver based on the filter associated with the road segment attribute information.

14. The apparatus of claim 13, wherein the location is identified by the computing device that is coupled to the vehicle based on one or more signals received by a Global Navigation Satellite System (GNSS) receiver associated with the computing device that is coupled to the vehicle.

15. The apparatus of claim 13, wherein the processor executes the instructions to further:
receive, at the communication transceiver from the computing device that is coupled to the vehicle, a speed of the vehicle.

16. The apparatus of claim 15, wherein the processor executes the instructions to further:
calculate a distance that the vehicle is to reach by traveling at the speed over a predetermined period of time, wherein a radius of the area that includes the location is at least as long as the distance.

17. The apparatus of claim 15, wherein the processor executes the instructions to further:
identify that the speed is below a predetermined speed threshold, wherein a size of the area that includes the location is set to a first predetermined size based on the speed being below the predetermined speed threshold, wherein the first predetermined size is smaller than a second predetermined size corresponding to speeds exceeding the predetermined speed threshold.

18. The apparatus of claim 15, wherein the processor executes the instructions to further:
identify that the speed exceeds a predetermined speed threshold, wherein a size of the area that includes the location is set to a second predetermined size based on the speed exceeding the predetermined speed threshold, wherein the second predetermined size is larger than a first predetermined size corresponding to speeds below the predetermined speed threshold.

19. The apparatus of claim 15, wherein the processor executes the instructions to further:
identify that the vehicle is speeding by identifying that the speed exceeds a speed limit of a first road segment corresponding to the location, wherein the one or more road segments include the first road segment and the road segment attribute information includes the speed limit of the first road segment.

20. The apparatus of claim 13, wherein the processor executes the instructions to further:
receive, at the communication transceiver from the computing device that is coupled to the vehicle, a heading of the vehicle, wherein filtering the data to identify the limited set of visual mapping data is based on the heading of the vehicle.

21. A non-transitory computer-readable storage medium having embodied thereon a program executable by a processor to perform a method for dynamic navigation, the method comprising:
receiving a location on a road from a computing device that is coupled to a vehicle, wherein the road is categorized into a class of a ranked set of classes;
identifying, based on the location and a bandwidth allocation, an area that includes the location;
identifying one or more road segments that each fall at least partially within the area;
receiving road segment attribute information about the one or more road segments;
reducing a bandwidth amount used to communicate with a communication interface of the computing device that is coupled to the vehicle, by filtering data to:
filter out irrelevant data to avoid sending the irrelevant data to the computing device that is coupled to the vehicle, and
identify, for sending to the computing device that is coupled to the vehicle, a limited set of visual mapping data associated with the one or more road segments to send to the computing device that is coupled to the vehicle using a filter associated with the road segment attribute information, wherein the limited set of visual mapping data includes roads categorized no lower than the class of the road among the ranked set of classes; and
sending, using a communication transmitter and according to the bandwidth allocation, the limited set of visual mapping data associated with the one or more road segments based on the filter associated with the road segment attribute information to the computing device that is coupled to the vehicle.

* * * * *